Oct. 14, 1958

C. H. BRAUER ET AL 2,855,801

FATIGUE TESTING MACHINE

Filed Nov. 2, 1954

INVENTORS
CLARENCE H. BRAUER
OTTO J. BRENNOLT
ALGIRDAS A. DIDZIULIS

Paul O. Pippel

ATTORNEY

Oct. 14, 1958

C. H. BRAUER ET AL 2,855,801

FATIGUE TESTING MACHINE

Filed Nov. 2, 1954

INVENTORS
CLARENCE H. BRAUER
OTTO J. BRENNOLT
ALGIRDAS A. DIDZIULIS

ATTORNEY

Oct. 14, 1958
C. H. BRAUER ET AL
2,855,801
FATIGUE TESTING MACHINE
Filed Nov. 2, 1954
3 Sheets-Sheet 3
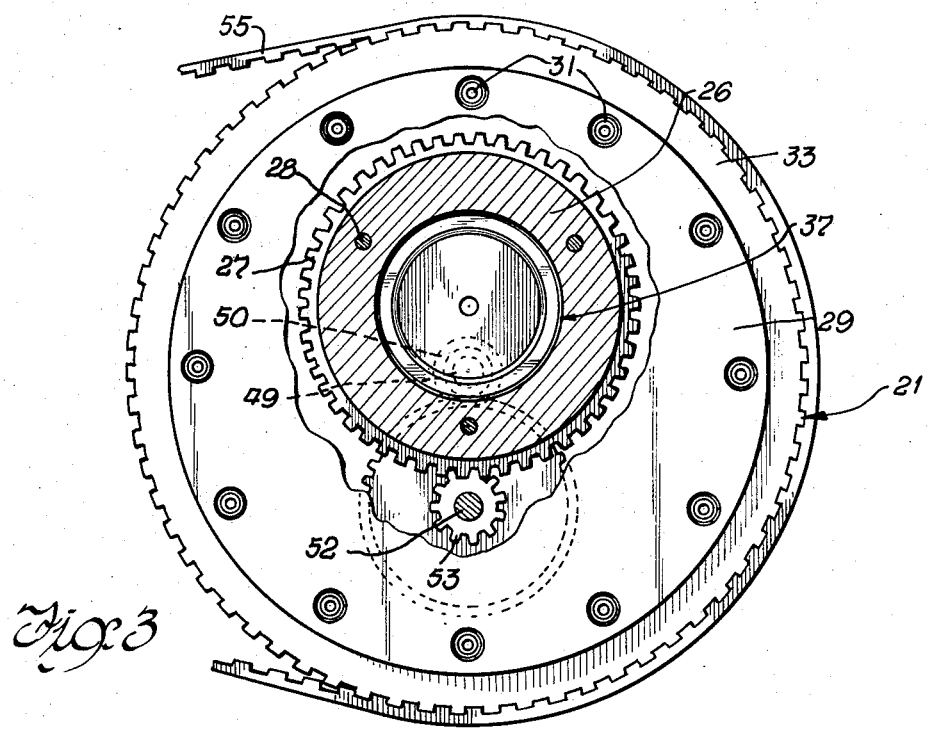
Fig. 3
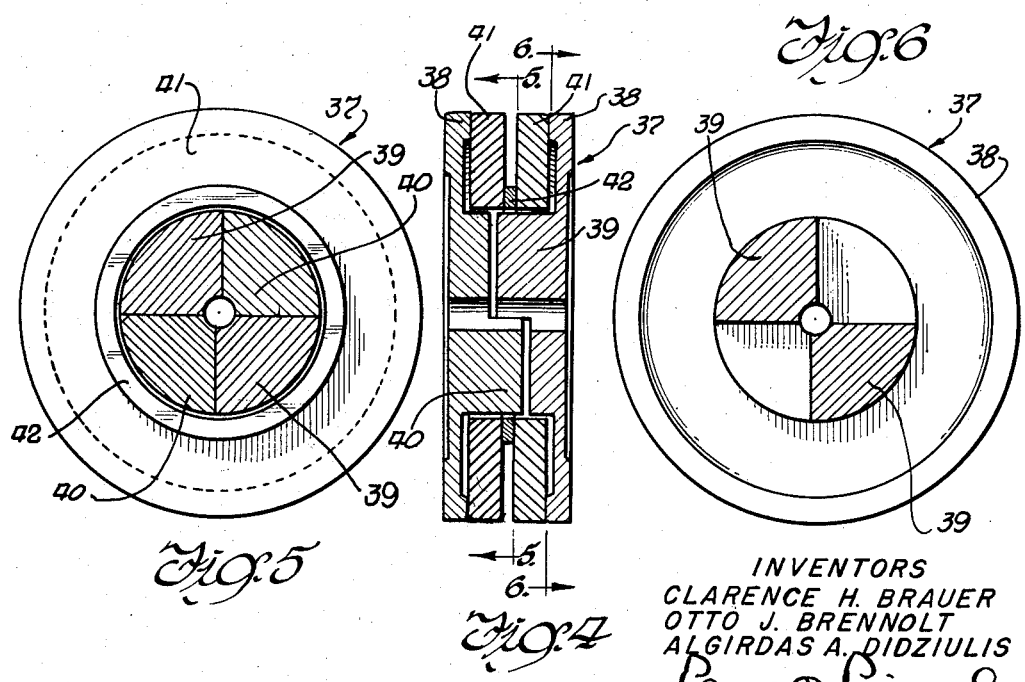
Fig. 5
Fig. 4
Fig. 6
INVENTORS
CLARENCE H. BRAUER
OTTO J. BRENNOLT
ALGIRDAS A. DIDZIULIS
Paul O. Pippel
ATTORNEY United States Patent Office 2,855,801
Patented Oct. 14, 1958

2,855,801

FATIGUE TESTING MACHINE

Clarence H. Brauer, Otto J. Brennolt and Algirdas A. Didziulis, Chicago, Ill., assignors to International Harvester Company, a corporation of New Jersey Application November 2, 1954, Serial No. 466,316

9 Claims. (Cl. 74—600)

This invention relates to an improved testing apparatus. More particularly it relates to a testing device for testing fatigue characteristics of structural parts.

In fatigue testing machines or devices, a reciprocable arm is generally attached to one end of the part to be tested. The other end of the test part may be suitably fastened to a stationary member and upon reciprocation of the arm of the test machine the structural test part is subjected to bending or twisting motion which in time will indicate fatigue failure characteristics which the structural part may possess. In other words, in most instances, the part is subjected to the bending stresses until failure occurs at which point analysis of the test part may be made. In testing devices it is, of course, desirable to subject the test part, as much as it is possible, to actual operating conditions so that a true operating test analysis can be made. In order to accomplish such accurate testing procedures, it is desirable that the reciprocating arm of the fatigue tester be adjused to various strokes during its reciprocation. In other words, the length of the stroke should be changed while the reciprocation of the arm is in progress. Such an adjustment of the stroke may be made automatically in response to certain test conditions previously set up or the adjustment may be made by an operator at the time the adjustment is desired.

It is a primary object of this invention, therefore, to provide a stroke adjusting mechanism adapted for an improved fatigue testing machine having an improved adjusting means for adjusting the stroke action of a reciprocating arm which is normally attached to the test part to be tested.

A still further object is to provide an improved fatigue testing apparatus having a reciprocable arm which may be operated at fast reciprocating speeds by a mechanism adapted to vary the length of the stroke of the reciprocating arm while it is operating on a part under test.

A still further object is to provide an improved fatigue testing machine having a reciprocable arm, the arm being normally actuated by an eccentric attached to a flywheel and including a stroke adjusting mechanism employing a power means and a gear train which is adapted to actuate the eccentric for varying the stroke of reciprocation of the arm of the apparatus.

A still further object is to provide an improved stroke adjusting mechanism for a flywheel type of fatigue testing machine, the stroke adjusting mechanism having a friction coupling means included therein for exerting a constant pressure against an eccentric which is actuated by the mechanism for varying the stroke of a reciprocating arm.

These and other objects will become more readily apparent from a reading of the specification when examined in connection with the accompanying sheets of drawings.

In the drawings:

Figure 3 is a cross sectional view through a flywheel housing taken substantially along the line 3—3 of Figure 2;

Figure 4 is a cross sectional view through a friction coupling assembly incorporated in a fatigue testing apparatus;

Figure 5 is a cross sectional view along the line 5—5 of Figure 4; and

Figure 6 is a cross sectional view along the line 6—6 of Figure 4.

Figure 1:
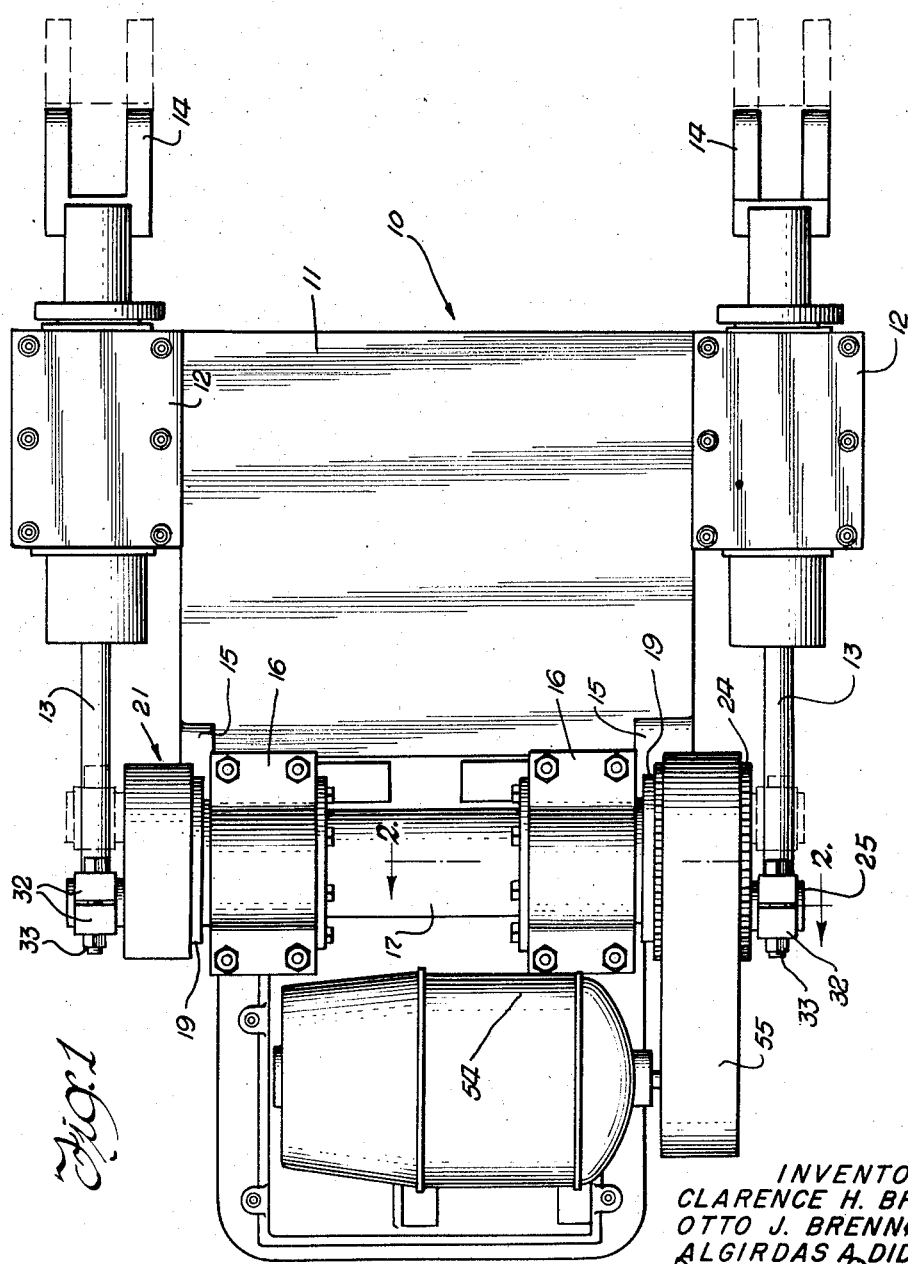
Figure 1 is a plan view of an improved fatigue testing apparatus.
Figure 2:
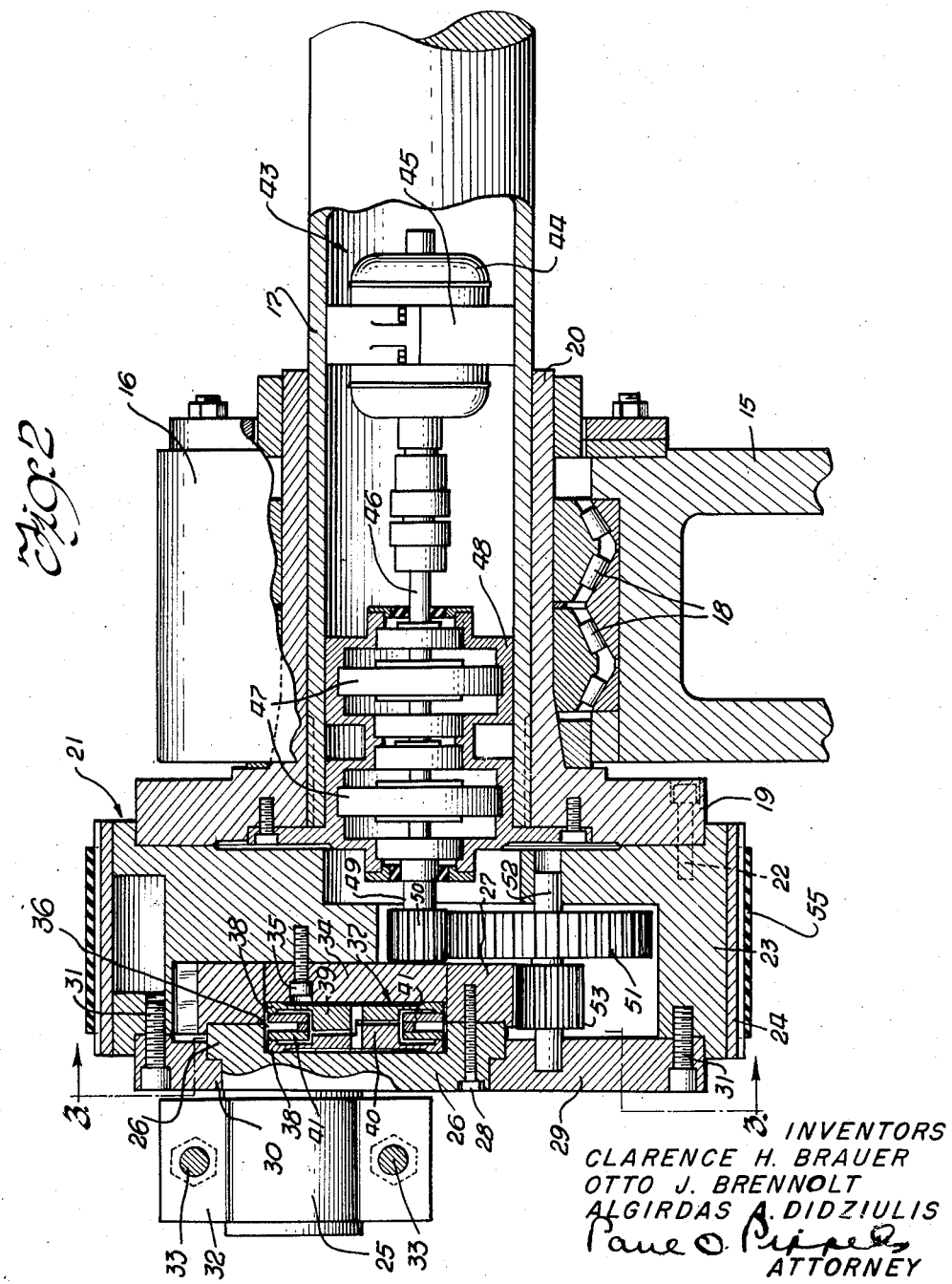
Figure 2 is a view, in cross section, of one side of a fatigue testing apparatus taken particularly along the line 2—2 of Figure 1.

A fatigue testing apparatus is best shown in Figure 1 and is designated by the reference character 10. The apparatus 10 comprises a support or housing 11 which is normally carried on the floor of a testing laboratory and securely connected thereto. The support 11 includes a pair of laterally spaced bearing casings 12 having suitable bearing provisions (not shown) for reciprocably positioning a pair of reciprocable arms 13. Each arm 13 is provided at one end with a clevis 14 which may be suitably attached to a test specimen or part which is to undergo fatigue test. As best shown in Figures 1 and 2, the casing includes laterally spaced vertical supporting means 15 suitably supporting laterally spaced bearing housings 16.

A tubular shaft 17 is supported within the bearing housings 16 on bearings 18. The type of fatigue testing apparatus which is disclosed is of the dual type, that is two reciprocating arms 13 are provided so that several test specimens may be operated on simultaneously. Thus, laterally spaced flywheel connector plates 19 are connected to the tubular shaft 17 by means of tubular extensions 20. In Figure 1 laterally spaced flywheel housings 21 are shown, each one of which serves to operate a reciprocable arm 13. In Figure 2 the internal parts and elements of the flywheel housing and associated parts are shown, it being understood that this arrangement is the same for actuating each of the arms 13. Each flywheel housing is connected to the connector plate 19 by means of bolts as indicated at 22. The flywheel housing 21 includes an annular plate 23 which is provided with a circumferentially extending drive ring 24. A stub shaft 25 projects laterally outwardly from the flywheel housing 21, the said shaft 25 being suitably connected to an eccentric plate 26. The plate 26, therefore, is eccentrically mounted with respect to the axis of the shaft 17 and the flywheel housing 21.

A gear 27, by means of bolts 28, is connected for rotation to the eccentric plate 26. A retainer plate 29 is in turn provided with a shoulder 30 on which the eccentric plate 26 is adapted to journally rotate. The retainer plate 29 is suitably connected to the flywheel housing 21 for rotation therewith by means of a plurality of bolts 31 as best indicated in Figure 3.

The stub shaft 25 of each flywheel housing 21 is connected to the arms 13 by means of coupling collars 32 suitably connected together by means of bolts 33. Within the housing 21 a face plate or opening means 34 is securely connected to the annular plate 23 by fasteners 35, one of which is shown in Figure 2. A recess 36 is provided between the face plate or engaging means 34 and the retainer plate 29. A friction coupling, generally indicated by the reference character 37, is positioned within the recess 36. As best shown in Figures 2, 4, 5 and 6, the friction coupling 37 comprises a pair of laterally spaced friction members or plates 38, one of said plates 38 being provided with segments or lugs generally indicated at 39 and the other being provided with segments or lugs 40. The lugs 39 are positioned in opposed relation and the lugs 40 are also positioned in opposed relation so that when the plates 38 are placed together in assembled relation the lugs 39 and 40 fit together to prevent relative turning of one plate 38 with respect to the other. The tolerances of the lugs 39 and 40 are sufficiently close so that there is a minimum of relative rotating movement between the plates 38 in the assembled relation. As indicated, particularly in Figure 4, resilient or spring washer-like disks 41 are positioned between the plates 38. A spacer 42 spaces the disks 41 between said plates 38. The spring disks 41 may be of conventional design and generally are shaped of slightly frusto-conical shape so as to exert, during compression, an outward thrust against the plates 38. In other words, the disks are resiliently constructed so that while they are held captive between plates 38 they exert axial pressures outwardly against said plates. Therefore as indicated in Figure 2, the friction coupling 37 is confined within the recess 36 and the recess 36 is sufficiently narrow so that the spring disks 41 are under compression, therefore tending to push the plates 38 axially outward against the engaging means 34 and against the eccentric plate 26.

Referring now particularly to Figure 2, a stroke adjusting mechanism is generally indicated at 43. Only one of these mechanisms 43 is shown, it being understood, however, that two are provided, one for each flywheel housing 21. The stroke adjusting mechanism 43 comprises a power unit 44 which is suitably carried on supports 45 within the tubular shaft 17. The power unit 44 drives a shaft 46 which in turn drives speed reduction units 47 suitably mounted in a housing 48 within the tubular shaft 17. An output shaft 49 extends outwardly from the speed reducers 47, the said shaft 49 having a gear 50 connected thereto for rotation therewith. The gear 50 is in driving mesh with a gear 51 journaled on a shaft 52 within the housing 21. A gear 53 is in turn connected to the shaft 52 for rotation therewith so that upon driving of the gear 51 the gear 53 is rotated, the said gear 53 also serving to drive the gear 27 for rotating the eccentric plate 26.

Both of the flywheel housings 21 are driven by means of an electric motor 54 which in turn drives a belt 55 in driving engagement with the drive ring 24 positioned on one of the flywheel housings 21 as indicated in Figure 1.

*The operation*

In the operation, test bars or other test specimens are connected to the clevises 14 of the fatigue testing apparatus 10. In most cases the test specimen is rigidly connected to a stationary anvil or other stationary member and the intent is to simulate operating conditions by reciprocating the arms 13 for determining the fatigue strength of the article being tested. After the test specimens have been suitably connected to the clevises 14 the machine may be set in operation. The motor 54 drives a belt 55 where upon rotation of the flywheel housings 21 is effected. As indicated above, the plates 26 are eccentrically positioned so that upon rotation the arms 13 are reciprocated in response to the eccentric action of the shafts 25. It is, of course, obvious that the length of the stroke or movement of the arms 13 can be changed by changing the eccentric axis of the shaft 25 relative to the axis of the flywheel housing 21.

In order to properly simulate various types of conditions to which a part may be subjected in actual operation, it is desirable to occasionally change the length of the stroke of each of the arms 13. Such a change should be made during high speed operation of the machine without the necessity of stopping the machine to effectuate such change. In most conventional machines where stroke adjustment is made during the operation of the machine it has been found that great wear and early breakdown occurs in the transmission or gear mechanism which actuates the eccentric in its change of position. Such failures occur because of the clashing of the gears and shock occasioned thereby resulting in premature wear and destruction of the power transmitting mechanism. By the utilization of applicants' novel friction coupling construction the eccentric 26 is constantly under a frictional force since the disk plates 41 constantly serve to urge the plates 38 in contact with the engaging means 34 and the eccentric 26. Thus a constant frictional force is exerted on the eccentric 26 and clashing of the gears 27, 53, 51 and 50 is eliminated.

The power units 44 of each of the stroke adjusting mechanisms 43 may be automatically controlled or actuated in response to conditions during the test. This automatic operation and change of stroke may be accomplished without supervision of the operator by the utilization of hydraulic mechanisms which are not shown since they form no part of the present invention. Upon rotation of the shaft 46 the output shaft 49 is actuated at a reduced speed, thus moving the gears 50, 51, 53 and 27. Rotation of the gear 27 also rotates the eccentric 26 changing the axis of the shaft 25. Thus the axis of the shaft 25 may be moved inwardly and outwardly with respect to the axis of the flywheel housing 21 so that the stroke of each of the arms 13 may be adjusted as desired. Such a change in stroke may be constantly made by actuation of the power unit 44 or it may be made at various intervals as desired. Despite high speed of operation of the flywheel housing 21 such change in stroke does not effect the proper operation of the stroke adjusting mechanism since clashing of the gears is prevented by the constant frictional force which is exerted upon the eccentric plate 26. Any tendency of the eccentric plate 26 to overrun or backlash is prevented by the constant force exerted by the disk plate 37. The power unit 44 is of the reversible type so that movement of the shaft 49 may be had in clockwise or counterclockwise rotation whichever is desired. Thus quick and accurate adjustment of the stroke of the arms 13 may be made by the actuation of the power unit 44. Since the stroke adjusting mechanism 43 is completely enclosed within the tubular shaft 17, proper protection for the mechanism is afforded and expeditious operation is assured.

It can now be seen that an improved stroke adjusting mechanism for fatigue testing machines has been described and illustrated. The object of the invention has been fully achieved and it now can be seen that a practical device has been provided which will result in accurate fatigue test procedures with the apparatus requiring a minimum of maintenance and attention of the operator. It must be understood that changes and modifications may be made in the invention without departing from the spirit or the scope of the accompanying claims.

What is claimed is:

1. A stroke adjusting mechanism for fatigue testing machines having a reciprocable member, said mechanism comprising a support, a tubular shaft journalled on said support, a flywheel connected to said tubular shaft for rotation therewith, said flywheel comprising a housing, a rotatable member carried on said housing, said rotatable member having its axis disposed eccentrically relative to the axis of the flywheel, a connector on said rotatable member adapted to be connected to the reciprocable member of a fatigue testing machine, said connector having its axis eccentrically disposed with respect to the axis of the rotatable member, power drive means disposed within the shaft, a speed reduction mechanism, an input shaft connecting said speed reduction mechanism to said drive means, an output shaft connected to said speed reduction mechanism and projecting into said housing, a power train within said housing connected to said output shaft to be driven thereby, a gear connected to said rotatable member and to the power train for rotating the rotatable member about its eccentric axis, a face plate connected within said housing for rotation therewith, said plate being disposed adjacent said rotatable member and being stationary with respect thereto, a friction coupling disposed between the face plate and the rotatable member, said friction coupling comprising laterally spaced friction members, and spring disks interposed between said friction members for urging one of said friction members against said rotatable member and the other friction member against said face plate whereby a constant frictional force is exerted against rotation of said rotatable member.

2. A stroke adjusting mechanism for fatigue testing machines having a reciprocable member, said mechanism comprising a support, a tubular shaft journalled on said support, a flywheel connected to said tubular shaft for rotation therewith, said flywheel including a housing, a rotatable member carried on said housing, said rotatable member having its axis disposed eccentrically relative to the axis of the flywheel, a connector on said rotatable member adapted to be connected to the reciprocable member of a fatigue testing machine, said connector having its axis eccentrically disposed with respect to the axis of the rotatable member, power drive means disposed within the shaft, a speed reduction mechanism connected to said power drive means, an output shaft connected to said speed reduction mechanism and projecting into said housing, a power train within said housing connected to said output shaft to be driven thereby, a gear connected to said rotatable member and to the power train for rotating the rotatable member about its eccentric axis, a face plate connected within said housing for rotation therewith, said plate being disposed adjacent said rotatable member and being stationary with respect thereto, a friction coupling disposed between the face plate and the rotatable member, said friction coupling comprising laterally spaced friction members, and spring disks interposed between said friction members for urging one of said friction members against said rotatable member and the other friction member against said face plate whereby a constant frictional force is exerted against rotation of said rotatable member.

3. A stroke adjusting mechanism for fatigue testing machines having a reciprocable member, said mechanism comprising a support, a tubular shaft journalled on said support, a flywheel connected to said tubular shaft for rotation therewith, said flywheel including a housing, a rotatable member carried on said housing, said rotatable member having its axis disposed eccentrically relative to the axis of the flywheel, a connector on said rotatable member adapted to be connected to the reciprocable memmber of a fatigue testing machine, said connector having its axis eccentrically disposed with respect to the axis of the rotatable member, power drive means disposed within the shaft, a speed reduction mechanism connected to said power drive means, an output shaft connected to said speed reduction mechanism, a power train within said housing connected to said output shaft to be driven thereby, rotatable means connected to said rotatable member and to the power train for rotating the rotatable member about its eccentric axis, a face plate connected within said housing for rotation therewith, said plate being disposed adjacent said rotatable member and being stationary with respect thereto, a friction coupling disposed between the face plate and the rotatable member, said friction coupling comprising laterally spaced friction members, and spring disks interposed between said friction members for urging one of said friction members against said rotatable member and the other friction member against said face plate whereby a constant frictional force is exerted against rotation of said rotatable member.

4. A stroke adjusting mechanism for fatigue testing machines having a reciprocable member, said mechanism comprising a support, a tubular shaft journalled on said support, a flywheel connected to said tubular shaft for rotation therewith, said flywheel including a housing, a rotatable member carried on said housing, said rotatable member having its axis disposed eccentrically relative to the axis of the flywheel, a connector on said rotatable member adapted to be connected to the reciprocable member of a fatigue testing machine, power drive means disposed within the shaft, a speed reduction mechanism connected to said power drive means, an output shaft connected to said speed reduction mechanism, a power train within said housing connected to said output shaft to be driven thereby, rotatable means connected to said rotatable member and to the power train for rotating the rotatable member about its eccentric axis, a face plate connected within said housing for rotation therewith, said plate being disposed adjacent said rotatable member and being stationary with respect thereto, a friction coupling disposed between the face plate and the rotatable member, said friction coupling comprising laterally spaced friction members, and spring disks interposed between said friction members for urging one of said friction members against said rotatable member and the other friction member against said face plate whereby a constant frictional force is exerted against rotation of said rotatable member.

5. A stroke adjusting mechanism for fatigue testing machines having a reciprocable member, said mechanism comprising a support, a tubular shaft journalled on said support, a flywheel connected to said tubular shaft for rotation therewith, said flywheel including a housing, a rotatable member carried on said housing, said rotatable member having its axis disposed eccentrically relative to the axis of the flywheel, a connector on said rotatable member adapted to be connected to the reciprocable member of a fatigue testing machine, power drive means disposed within the shaft, a speed reduction mechanism connected to said power drive means, an output shaft connected to said speed reduction mechanism, a power train within said housing connected to said output shaft to be driven thereby, rotatable means connected to said rotatable member and to the power train for rotating the rotatable member about its eccentric axis, a friction face on said flywheel, said face being disposed adjacent said rotatable member and being stationary with respect thereto, a friction coupling disposed between the face and the rotatable member, said friction coupling comprising laterally spaced friction members, and spring disks interposed between said friction members for urging one of said friction members against said rotatable member and the other friction member against said face whereby a frictional force is exerted against rotation of said rotatable member.

6. A stroke adjusting mechanism for fatigue testing machines having a reciprocable member, said mechanism comprising a support, a tubular shaft journalled on said support, a flywheel connected to said tubular shaft for rotation therewith, said flywheel including a housing, a rotatable member carried on said housing, said rotatable member having its axis disposed eccentrically relative to the axis of the flywheel, a connector on said rotatable member adapted to be connected to the reciprocable member of a fatigue testing machine, power drive means disposed within the shaft, a speed reduction mechanism connected to said power drive means, an output shaft connected to said speed reduction mechanism, a power train within said housing connected to said output shaft to be driven thereby, rotatable means connected to said rotatable member and to the power train for rotating the rotatable member about its eccentric axis, a friction face on said flywheel, said face being disposed adjacent said rotatable member and being stationary with respect thereto, a friction coupling disposed between the face and the rotatable member, said friction coupling comprising laterally spaced friction members, and means interposed between said friction members for urging one of said brake members against said rotatable member and the other friction member against said face whereby a frictional force is exerted against rotation of said rotatable member.

7. A stroke adjusting mechanism for a fatigue testing machine having a reciprocable member, said mechanism comprising a support, a shaft journalled on said support, a flywheel connected to said shaft for rotation therewith, said flywheel having a housing, a rotatable member supported on said housing on an axis eccentric with respect to the axis of the flywheel, said rotatable member being adapted to be connected to the reciprocable member of a fatigue testing machine, a power actuator mounted on said support, power transmission means connected to said power actuator and said rotatable member for rotating the same, engaging means on said housing, and a friction coupling disposed adjacent said engaging means and engaging the same and said rotatable member for exerting a resilient frictional pressure against said rotatable member during rotation of said flywheel.

8. A stroke adjusting mechanism for a fatigue testing machine having a reciprocable member, said mechanism comprising a support, a shaft journalled on said support, a flywheel connected to said shaft for rotation therewith, said flywheel having a housing, a rotatable member supported on said housing on an axis eccentric with respect to the axis of the flywheel, said rotatable member being adapted to be connected to the reciprocable member of a fatigue testing machine, a power actuator mounted on said support, power transmission means connected to said power actuator and said rotatable member for rotating the same, engaging means on said housing, and a friction coupling comprising spring disks disposed adjacent said engaging means and engaging the same and said rotatable member for exerting a resilient frictional pressure against said rotatable member during rotation of said flywheel.

9. A stroke adjusting mechanism for a fatigue testing machine having a reciprocable member, said mechanism comprising a support, a tubular shaft journalled on said support, a flywheel connected to said shaft for rotation therewith, said flywheel having a housing, a rotatable member supported on said housing on an axis eccentric with respect to the axis of the flywheel, said rotatable member being adapted to be connected to the reciprocable member of a fatigue testing machine, a power actuator carried within said shaft, power transmission means connected to said power actuator and said rotatable member for rotating the same, engaging means on said housing, and a friction coupling disposed adjacent said engaging means and engaging the same and said rotatable member for exerting a resilient frictional pressure against said rotatable member during rotation of said flywheel.

References Cited in the file of this patent

UNITED STATES PATENTS

| | | |
|---|---|---|
| 2,215,958 | Fullerton | Sept. 24, 1940 |
| 2,241,378 | Evans | May 13, 1941 |
| 2,243,413 | Buckingham | May 27, 1941 |
| 2,327,843 | Jesionowski | Aug. 24, 1943 |
| 2,455,842 | Weigel | Dec. 7, 1948 |
| 2,467,677 | Hermite | Apr. 19, 1949 |